United States Patent [19]

Wilde

[11] 4,289,186
[45] Sep. 15, 1981

[54] SEALING MEANS FOR PNEUMATIC TIRE AND WHEEL RIM ASSEMBLIES

[75] Inventor: Ralph Wilde, near Leamington Spa, England

[73] Assignee: Dunlop Limited, West Midlands, England

[21] Appl. No.: 125,631

[22] Filed: Feb. 28, 1980

[30] Foreign Application Priority Data

Mar. 7, 1979 [GB] United Kingdom ............... 08018/79

[51] Int. Cl.³ .......................... B60C 5/16; B60C 19/04
[52] U.S. Cl. ........................... 152/379.3; 152/330 RF; 152/366; 152/385
[58] Field of Search ................. 152/152, 158, 330 RF, 152/363–366, 378, 379.3, 385, 386, 388, 396, 399, 400; 301/95–98, 30–34 R

[56] References Cited

U.S. PATENT DOCUMENTS

| 2,754,876 | 7/1956 | King | 152/363 |
| 2,913,034 | 11/1959 | Wall | 152/366 |
| 3,682,219 | 8/1972 | Lindley | 152/158 |
| 3,924,670 | 12/1975 | Tangorra et al. | 152/375 |
| 3,965,957 | 6/1976 | Nakasaki | 152/379.3 |
| 4,108,232 | 8/1978 | Simpson | 152/365 |
| 4,173,243 | 11/1979 | Wilde et al. | 152/158 |
| 4,197,892 | 4/1980 | Boileau | 152/158 |

FOREIGN PATENT DOCUMENTS 2030085 4/1980 United Kingdom .

Primary Examiner—John E. Kittle
Attorney, Agent, or Firm—Stevens, Davis, Miller & Mosher

[57] ABSTRACT

Sealing means for a pneumatic tire and wheel rim assembly in which the wheel rim has a pair of axially spaced bead seats defined by grooves in each of which a respective one of a pair of axially spaced tire beads is located and retained. The sealing means comprises two seal elements each having a resiliently deformable portion which acts between confronting axially directed surfaces of the associated tire bead and bead seat to facilitate assembly and subsequently hold the tire bead under compression in an axial direction to prevent the tire bead slipping relative to the wheel rim.

8 Claims, 3 Drawing Figures

SEALING MEANS FOR PNEUMATIC TIRE AND WHEEL RIM ASSEMBLIES

This invention concerns improvements in or relating to sealing means for pneumatic tire and wheel rim assemblies and in particular to sealing means for an assembly in which the rim has a pair of axially spaced bead seats defined by grooves in each of which a respective one of a pair of axially spaced tire beads is located and retained.

According to one aspect of the present invention there is provided sealing means for a pneumatic tire and wheel rim assembly in which the rim has a pair of axially spaced bead seats defined by grooves in each of which a respective one of a pair of axially spaced tire beads is located and retained, the sealing means comprising a pair of elastomeric seal elements, each seal element being constructed and arranged to act between a respective one of said tire beads and the associated groove whereby each tire bead is held under compression in an axial direction in the associated groove.

Preferably each seal element has a resiliently deformable portion constructed and arranged to act between confronting axially directed surfaces of the tire bead and the associated groove which portion is resiliently deformable to facilitate insertion of the seal element and tire bead into the groove during assembly and which subsequently holds the bead under compression.

Each seal element may be of generally channel section so as to embrace the tire bead and provide lining for the associated groove. Conveniently each seal element may have an internal profile complementary to that of the tire bead and an external profile complementary to that of the associated groove. With this arrangement it may be possible to effect a seal between non-matching tire beads and grooves, for example a circular section bead and square section groove, by appropriate construction of the seal element.

Each seal element may have an axially and radially outwardly tapered portion which seats against the lower region of the adjacent tire sidewall and which is urged against the sidewall by inflation pressure thereby improving the sealing effect.

Conveniently each seal element is molded from a resilient elastomeric material, for example butyl rubber, which is air-impermeable.

The seal elements may be separate components. Alternatively the seal elements may be defined by the edge portions of a seal member adapted to extend circumferentially around the radially outer surface of the rim and across the axial width of the rim between the bead seats. Preferably the seal member is molded to the contour of the rim to which it is fitted.

Preferably the sealing means is in the form of a closed loop. However, the sealing means may be cut from extruded strips of the appropriate profile.

The construction in which the seal elements are part of the seal member is particularly suitable for assemblies in which the rim is multi-component. Thus the tire and seal member define an air-tight inflation chamber and air cannot leak through the interface between adjacent rim components. The necessity to provide additional sealing means for the rim components such as an inner tube or a seal component at each interface between adjacent rim components is thereby avoided.

Separate seal elements are suitable for use with assemblies in which the rim is a single component.

The sealing means of the present invention is therefore particularly suitable for use with the pneumatic tire and wheel rim assembly disclosed in the assignee's co-pending U.K. published Patent Application No. published 2,030,085A published on Apr. 2, 1980. In said U.K. Patent Application the wheel rim may be a single component or multi-component.

According to another aspect of the present invention there is provided a pneumatic tire and wheel rim assembly in which the rim has a pair of axially spaced bead seats defined by grooves in each of which a respective one of a pair of axially spaced tire beads is located and retained and sealing means comprising a pair of elastomeric seal elements each of which acts between a respective one of said tire beads and the associated groove whereby each tire bead is held under compression in an axial direction in the associated groove.

The invention will now be described, by way of example only, with reference to the accompanying drawings wherein.

Figure 1:
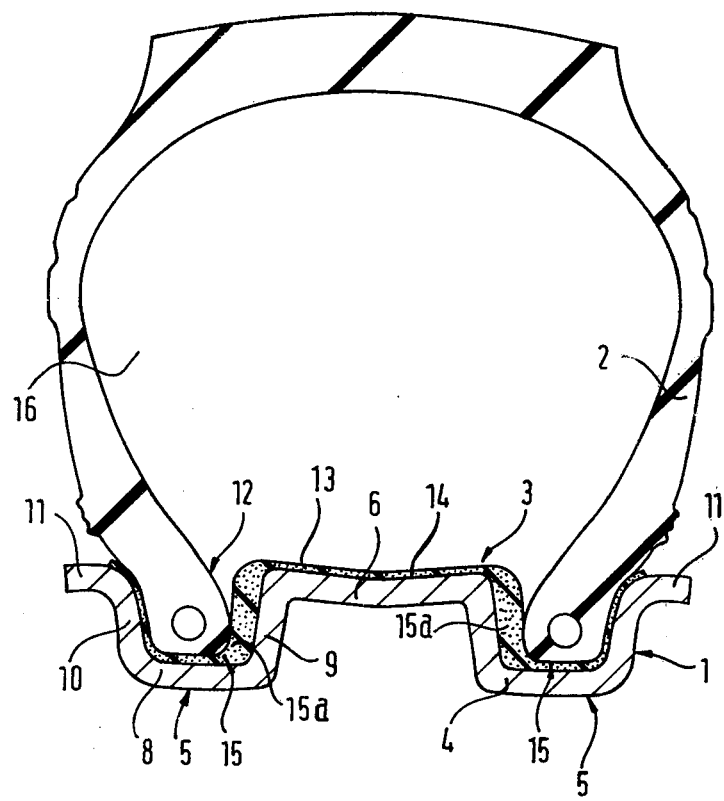
FIG. 1 is a section through a multi-component rim and tire assembly incorporating sealing means according to the present invention.
Figure 2:
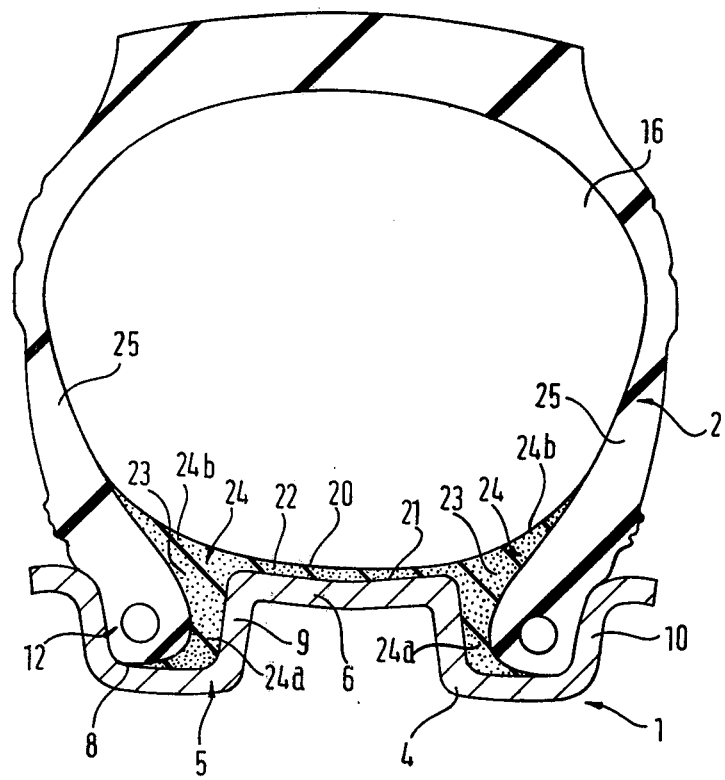
FIG. 2 is a section through a multi-component rim and tire assembly incorporating alternative sealing means according to the present invention.

The assemblies shown in FIGS. 1 and 2 of the accompanying drawings each comprise a multi-component well-less wheel rim 1 having a radial ply tire 2 mounted thereon and sealing means 3 to provide a seal between adjacent rim components 4.

Figure 3:
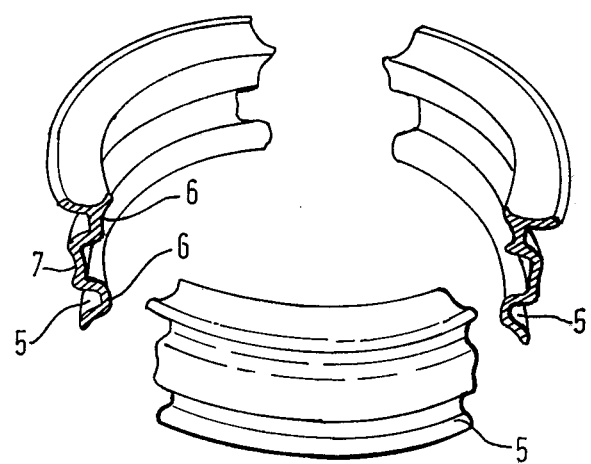
FIG. 3 is an exploded perspective view of the wheel rim of the assemblies shown in FIGS. 1 and 2.

The rim 1 is formed by three similar rim components 4 (FIG. 3) and comprises a pair of axially spaced bead seats 5 separated by an annular rim portion 6. Each bead seat 5 is similar and comprises an annular channel-section groove having a base portion 8 and opposed side portions 9,10. The axially inner side portions 9 lead to the rim portion 6 while the axially outer side portions 10 terminate in rolled over radii 11. Each bead seat 5 locates a respective one of a pair of axially spaced reinforced tire beads 12. Each bead reinforcement is substantially inextensible and has a diameter less than the maximum diameter of the side portions 9,10 of the associated groove. As a result each bead 12 is retained in the associated groove and cannot be displaced from the groove, for example following partial or complete deflation of the tire. A bead retention system of this type forms the subject matter of our above-mentioned co-pending U.K. published Patent Application No. 2,030,085A.

The sealing means 3 shown in FIG. 1 comprises an elastomeric seal member 13 formed from an air-impermeable material, for example a rubber such as butyl rubber, molded to the profile of the wheel rim 1. The member 13 extends circumferentially around the radially outer surface 14 of the wheel rim and across substantially the entire axial width of the wheel rim so as to line each groove and the rim portion 6. The edge portions of the member 13 which line the grooves define seal elements 15. A portion 15a of each seal element is of increased thickness and lines the axially inner side portion 9 of the associated groove. The portions 15a are resiliently deformable to facilitate insertion of the seal elements and tire beads into the grooves during assembly. Subsequently each bead 12 is held under compression in the associated groove by the portion 15a of the associated seal element. As a result the tire beads are prevented from slipping relative to the wheel rim following deflation of the tire.

Assembly of the rim 1, tyre 2 and seal member 13 is as follows, the seal member 13 is fitted to the tyre 2 so that the beads 12 locate in the channel-section seal elements 15 defined by the axially outer edges of the seal member and then the rim components 4 are fitted in turn. The rim components are secured in position by a wheel disc (not shown). The tire 2 and seal member 13 define an air-tight inflation chamber 16 such that the tire can be inflated via the usual valve (not shown).

The sealing means shown in FIG. 2 comprises an elastomeric seal member 20 formed from air-impermeable material, for example a rubber such as butyl rubber. The member 20 extends circumferentially around the radially outer surface 21 of the wheel rim and comprises a center portion 22 of uniform thickness and axially outer edge portions 23 of increased thickness defining seal elements 24. The center portion 22 lines the rim portion 6 and the edge portions 23 seal against the tire 2. Each seal element 24 is similar and comprises first and second seal components 24a,24b having the shape shown. The first seal component 24a lines the axially inner side portion 9 of the associated groove. The components 24a are resiliently deformable to facilitate assembly and subsequently each bead 12 is held under compression in the associated groove by the component 24a. As a result the tire beads are prevented from slipping relative to the wheel rim following deflation of the tire. The second seal component 24b comprises a flap or wing tapered in the axially and radially outwards direction and profiled to seat against the lower region of the adjacent tire sidewall 25.

Assembly of the rim 1, tire 2 and sealing means 3 is as follows, the seal member 20 is fitted to the tyre 2 so that the tapered wings 24b seat against the lower region of the tire sidewalls and then the rim components 4 are fitted in turn so that the seal components 24a and the beads 12 are located in the grooves. The rim components are secured in position by a wheel disc (not shown). The tire 2 and seal member 20 define an air-tight inflation chamber 26 such that the tire 2 can be inflated via the usual valve (not shown). It will be appreciated that inflation pressure acting on the seal member 20 tends to urge the wings 24b axially outwards against the adjacent tire sidewall 25 thereby increasing the sealing effect of the wings 24b.

The invention is not restricted to the abovedescribed embodiments, for example each seal element 15 (FIG. 1) may have a resiliently deformable portion of increased thickness which lines the axially outer side portion 10 of the associated groove in place of or in addition to the portion 15a of increased thickness which lines the axially inner side portion 9. It will be appreciated that by making a portion of the seal elements of increased thickness, which portion can be resiliently deformed, location of the tyre beads and seal elements in the grooves is facilitated.

It will be appreciated that the dimensions of the seal elements 15,24, tire beads 12 and grooves can be varied provided the seal elements and tire beads remain an interference fit in the grooves to ensure the tire beads are held under compression in an axial direction.

The rim 1 may be made as a single component in which the grooves are shaped by a secondary forming operation after the tire has been located in position on the rim. In this construction it is not necessary to provide a seal member which lines the portion of the rim between the grooves and the seal elements 15,24 may be formed separately.

It will be understood that the sealing means 3 can be formed to suit any profile of rim or rim and tire assembly. In this way tire beads can be fitted to non-matching grooves, for example in the above-described embodiments the tire beads 12 are of generally arcuate cross-section and the grooves are of generally rectangular cross-section.

Furthermore the sealing means can be used with radial, cross-ply or belted bias tire and wheel rim assemblies while the rims may be well-less as described or include a well.

Finally while it is preferred to form the sealing means as an annular closed loop of the appropriate profile and size to fit a given tire and wheel rim assembly the sealing means may be formed as a strip, eg by extrusion, having a profile to fit a range of wheel rim sizes each having a corresponding profile so that a section of the appropriate length may be cut from the strip to form sealing means for a given rim size.

Having now described my invention what I claim is:

1. A pneumatic tire and wheel rim assembly in which said rim has a pair of axially spaced bead seats defined by grooves in each of which a respective one of a pair of substantially inextensible axially spaced tire beads is located and retained and sealing means comprising a pair of elastomeric seal elements each of which acts between a respective one of said tire beads and the associated groove whereby each tire bead is held under compression in an axial direction in the associated groove so that the seal elements seal the beads to the rim by axial compression.

2. An assembly according to claim 1 wherein each seal element has a resiliently deformable portion which acts between an axially inwardly and/or an axially outwardly directed surface of said tire bead and the associated groove.

3. An assembly according to claim 1 wherein each seal element is of generally channel section so as to embrace said tire bead and provide a lining for the associated groove.

4. An assembly according to claim 1 wherein each seal element has an axially and radially outwardly tapered portion which seats against the lower region of the adjacent tire sidewall.

5. An assembly according to claim 1 wherein each seal element is defined by the lateral edge portions of a seal member which extends circumferentially around the radially outer surface of said rim and across the axial width of said rim between said bead seats.

6. An assembly according to claim 1 wherein each tire bead has a bead reinforcement and the diameter of said bead reinforcement is less than the maximum diameter of the associated groove side portions.

7. An assembly according to claim 1 wherein the rim is multi-component and well-less.

8. An assembly according to claim 1 wherein said tyre is selected from the group consisting of a radial, cross-ply and belted bias tire.

* * * * *